Figure 1:
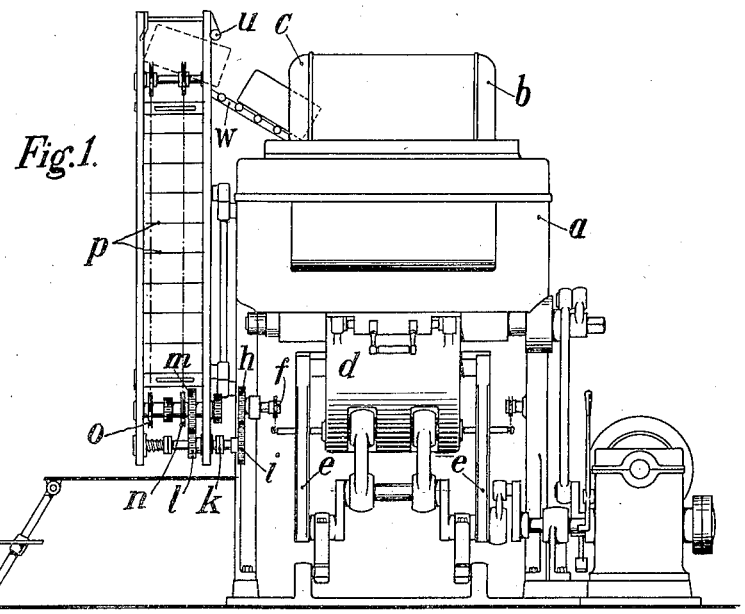

Oct. 24, 1933.  C. WINKLER  1,932,238
DEVICE FOR FEEDING USED STEREOTYPE PLATES INTO A MELTING POT
Filed Oct. 10, 1930  2 Sheets-Sheet 1

Inventor:
Carl Winkler
By C. C. Powell
Atty.

Oct. 24, 1933.  C. WINKLER  1,932,238
DEVICE FOR FEEDING USED STEREOTYPE PLATES INTO A MELTING POT
Filed Oct. 10, 1930  2 Sheets-Sheet 2

Inventor:
Carl Winkler

Patented Oct. 24, 1933

1,932,238

UNITED STATES PATENT OFFICE 1,932,238

DEVICE FOR FEEDING USED STEREOTYPE PLATES INTO A MELTING POT

Carl Winkler, Bern, Switzerland

Application October 10, 1930, Serial No. 487,767, and in Germany October 24, 1929

3 Claims. (Cl. 22—80)

The invention relates to a device for feeding used stereotype plates into a melting pot by means of transport chains. According to the invention the transport chains, on which the plates are placed by hand, are driven through a certain distance each time a mould arranged near the melting pot is moved, so that the plates are intermittently fed to the melting pot.

An advantage of this device consists in the fact that the weight of the mould shell, when being lowered, contributes to the movement of the transport chains, and, at the same time, the mould will be moved less abruptly.

In the drawings illustrating the invention by way of example

Figure 2:
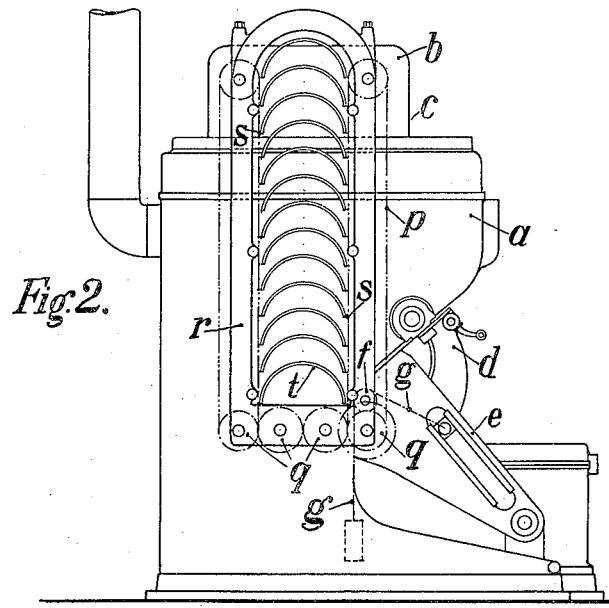

Fig. 1 shows a front elevation of a casting machine having an automatic device for feeding used plates, Fig. 2 is a side elevation, and

Fig. 3 a plan.

The casting machine is provided with a melting pot $a$ having a hood $b$, one side of which has an opening for allowing the used plates to pass through. The mould, in the casting position, is in immediate communication with an opening in the bottom of the melting pot, and, after the casting operation, the shell of this mould is moved down away from the pot in the guide $e$ by the usual known device.

This lowering of the mould shell $d$ is used, according to the invention, to move a chain-wheel $f$ by means of the chain $g$ which, at one end, is fastened to the mould shell $d$, and, at the other end, carries a counter weight. The chain-wheel $f$, through the spur-wheels $h$, $i$, clutch $k$, spur-wheels $l$, $m$ and chain wheels $n$, $o$ drives the two chains $p$, and, through the four similar spur-wheels $q$, also two corresponding chains $r$. The four chains $p$, $r$ are provided, at equal distances apart, with bars $s$, on which the plates $t$ are placed.

Each time the mould $d$ is opened the chains $p$, $r$ together with the plates resting on same are moved by the described gearing intermittently upwards, the top plate being tilted by a roller $u$, so that it will slide on the roller-way $w$ down into the melting pot.

The lowest plate $t$ just placed on the chain bars $s$ is at a convenient height for handling from the floor.

Figure 3:
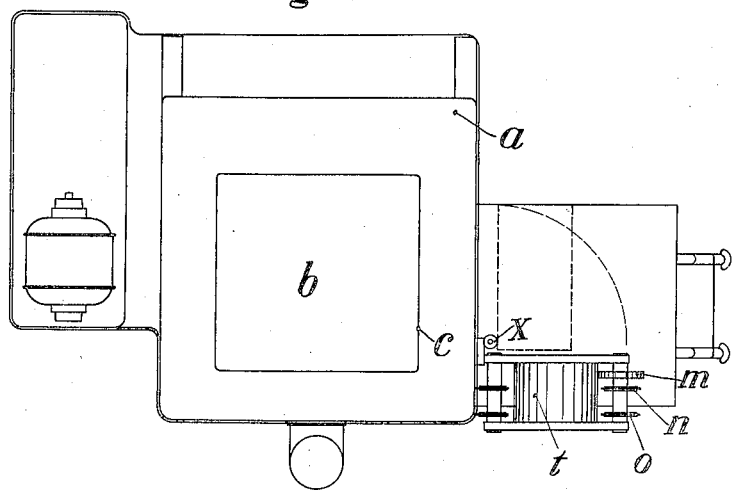

The frame of the plate feeding device is hinged at $x$ to the furnace wall and can be swung sideways (Fig. 3) when it is desired to obtain access to the fire which, usually, is on the same side of the machine. In swinging away the frame the two clutch parts $k$ are separated from each other, so that the driving part $i$ is not in the way.

What I claim and desire to secure by Letters Patent of the United States is:—

1. In a stereotype plate casting machine, having a melting pot, a mold adapted to be moved into and out of operative relation with said melting pot, operating means for said mold and conveying means, including a series of upwardly extending endless chains, for feeding used stereotype plates or the like to said pot, the combination of mechanism including a train of gears associated with said operating means to move said conveying means a predetermined amount by the actuation of said mold.

2. In a stereotype plate casting machine, having a melting pot, a mold adapted to be moved into and out of operative relation with said melting pot, operating means for said mold and conveying means, including a series of upwardly extending endless chains, for feeding used stereotype plates or the like to said pot, the combination of mechanism including a train of gears and a clutch member associated with said operating means to move said conveying means a predetermined amount by the actuation of said mold, and means for swinging said conveying means out of its operative position whereby said clutch member will be rendered inoperative.

3. In a stereotype plate casting machine, having a melting pot, a mold adapted to be moved into and out of operative relation with said melting pot, operating means for said mold and conveying means, including a series of upwardly extending endless chains, for feeding used stereotype plates or the like to said pot, the combination of mechanism including a train of gears associated with said operating means to move said conveying means a predetermined amount by the actuation of said mold, the arrangement being such that the weight of the mold contributes to the movement of said conveying means.

CARL WINKLER.